United States Patent
Betts et al.

(10) Patent No.: US 8,112,472 B2
(45) Date of Patent: *Feb. 7, 2012

(54) METHOD AND APPARATUS FOR SUPPORTING MULTIPLE VERSIONS OF A WEB SERVICES PROTOCOL

(75) Inventors: Christopher Betts, Mount Dandenong (AU); Tony Rogers, Rowville (AU)

(73) Assignee: Computer Associates Think, Inc., Islandia, NY (US)

( * ) Notice: Subject to any disclaimer, the term of this patent is extended or adjusted under 35 U.S.C. 154(b) by 1351 days.

This patent is subject to a terminal disclaimer.

(21) Appl. No.: 11/132,637

(22) Filed: May 19, 2005

(65) Prior Publication Data

US 2005/0278396 A1  Dec. 15, 2005

Related U.S. Application Data

(60) Provisional application No. 60/573,597, filed on May 21, 2004.

(51) Int. Cl.
G06F 15/16 (2006.01)
G06F 17/30 (2006.01)
(52) U.S. Cl. ......... 709/203; 709/201; 707/770
(58) Field of Classification Search ......... 709/201, 709/203; 707/770
See application file for complete search history.

(56) References Cited

U.S. PATENT DOCUMENTS

| | | | | |
|---|---|---|---|---|
| 6,279,003 B1* | 8/2001 | Lee et al. | | 707/100 |
| 6,782,003 B1* | 8/2004 | Giroux et al. | | 370/466 |
| 6,961,760 B2* | 11/2005 | Li et al. | | 709/219 |
| 7,370,118 B2* | 5/2008 | Tan et al. | | 709/238 |
| 2002/0116454 A1* | 8/2002 | Dyla et al. | | 709/203 |
| 2003/0074401 A1* | 4/2003 | Connell et al. | | 709/203 |
| 2004/0025117 A1 | 2/2004 | Ingersoll et al. | | |
| 2004/0068586 A1 | 4/2004 | Xie et al. | | |
| 2005/0235009 A1* | 10/2005 | Purdy et al. | | 707/203 |

FOREIGN PATENT DOCUMENTS

| WO | WO 03/077156 A1 | 9/2003 |
|---|---|---|
| WO | WO 2004/019231 A2 | 3/2004 |

OTHER PUBLICATIONS

Rompothong, P. and Senivongse, T. 2003. A query federation of UDDI registries. In Proceedings of the 1st international Symposium on information and Communication Technologies (Dublin, Ireland, Sep. 24-26, 2003). ACM International Conference Proceeding Series, vol. 49. Trinity College Dublin, 561-566.*

UDDI.ORG: "*UDDI Technical White Paper*", vol. 1, XP 00230398 (13 pages), Sep. 6, 2000.

Notification of Transmittal of the International Search Report and the Written Opinion of the International Searching Authority for International Application No. PCT/US2005/017781, filed May 19, 2005 (12 pages).

Notification of Transmittal of the International Search Report and the Written Opinion of the International Searching Authority for International Application No. PCT/US2005/017788, filed May 19, 2005, (6 pages).

* cited by examiner

*Primary Examiner* — Yemane Mesfin
*Assistant Examiner* — Carlos Perez
(74) *Attorney, Agent, or Firm* — Baker Botts L.L.P.

(57) ABSTRACT

Methods and apparatuses for supporting multiple versions of a web services protocol are provided. A data object is stored in a repository. The data object in the repository is indexed by using a first identifying key conforming to a first web services protocol and is also indexed by using a second identifying key conforming to a second web services protocol.

34 Claims, 5 Drawing Sheets

METHOD AND APPARATUS FOR SUPPORTING MULTIPLE VERSIONS OF A WEB SERVICES PROTOCOL

CROSS-REFERENCE TO RELATED APPLICATION

This application claims the benefit of U.S. provisional application Ser. No. 60/573,597, filed May 21, 2004 and entitled "METHOD AND APPARATUS FOR SUPPORTING MULTIPLE VERSIONS OF A WEB SERVICES PROTOCOL".

TECHNICAL FIELD

The present disclosure relates to web services and, more specifically, to supporting multiple versions of a web services standard.

DESCRIPTION OF THE RELATED ART

Computer systems are commonly used by enterprises and other organizations to store and manage information (in many instances, confidential and/or sensitive information). Constituents of the enterprises and organizations often have around-the-clock access to the stored information through the use of websites and related web-based services. Computer systems as referred to herein may include individual computers, servers, computing resources, networks, etc.

Web services present a new way for computer to communicate with each other. Web services are software systems that can be identified by Universal Resource Identifiers (URI), analogous to identification of websites by Uniform Resource Locator (URL). Web services generally contain public interfaces and bindings that enable other software systems (such as other web services) to use the functionality seamlessly of the former. In this way, web services enhance the way computers communicate with each other, and therefore are transforming the way modern enterprises interact and share information.

Some cross-platform programming languages have been developed to enable the vast variety of computer systems to communicate with each other. A popular example of one such computer language is Extensible Markup Language (XML). Many web services interact with one another using XML which is a human readable format. In addition, web services are also used in non-English environments through the use of Unicode which is a universal language code.

Users (for example, individuals and software systems) seeking to access a web service generally must locate and connect to the web service. Therefore, a software system is adapted to be able to locate and connect to the web service, before the software system can utilize the functionality of a web service. The process of locating and connecting to a web service is commonly known as discovery and integration. The Universal Description, Discovery and Integration (UDDI) standards have been adopted to facilitate discovery and integration.

Users can use repositories employing UDDI standards to find the location of web services, in a manner similar to looking for service providers in a yellow pages phone book. UDDI repositories may also describe the functionality of listed web services utilizing a standardized vocabulary. UDDI repositories generally are provided as directories in which information pertaining to an enterprise, its services, technical information, and information about specifications for the enterprise's web services (for example, web service URIs) can be looked up.

The UDDI standards have been modified several times since its inception. However, not every user has immediately adapted to the latest standards as they are released. This results in users using multiple different versions of UDDI standards.

The various UDDI versions differ in a number of ways. Some of these differences give rise to incompatibilities. Incompatibilities threaten the usefulness of web services, because web services rely on the seamless compatibility across multiple platforms.

When information is saved in a UDDI repository, a UDDI registry may assign to the saved data unique identifying keys, which can then be used to access the specific data instances on demand. The keys are used as unique identifiers for the corresponding data objects in the UDDI repository. UDDI objects may refer to each using the keys. The keys provide a location function for the data requested.

The various UDDI versions have different methods for generating unique identifying keys. This distinction can create incompatibilities in the way web services request and send information to one another.

For example, UDDI Version 2 uses keys which are generally Universal Unique Identifiers (UUID). A UUID is generally a hexadecimal string, machine generated according to a very exacting algorithm that prevents duplicate UUIDs from being generated. An example of a UUID is 5a389ad2-22dd-11d1-aa77-002035b29092.

UDDI Version 3 uses keys which are generally URI keys chosen by the user to be descriptive and meaningful in a comparable fashion to URLs. An example of a Version 3 key is uddi:acme.com:my_web_service.

It may sometimes be possible to convert keys between UDDI versions. For example, algorithms exist that can convert a Version 3 key to a unique Version 2 key. One example of such an algorithm can be found in UDDI Version 3, published specification dated 19 Jul. 2002, paragraph 10.1.1.

However, algorithms used to convert Version 3 keys to Version 2 keys are often irreversible, that is, it is not always possible to convert a Version 2 key back to the Version 3 key which was used to generate the Version 2 key.

In some situations, it is possible to use a map to keep track of the predefined Version 2 keys corresponding to predefined Version 3 keys (and vice versa). However, maps are not effective where keys are not predefined, or are otherwise unknown.

There is a need for a web service server that can simultaneously support multiple versions of the UDDI protocol.

SUMMARY

This application describes methods and apparatuses for supporting multiple versions of a web services protocol. A method for supporting multiple versions of a web services protocol, according to an exemplary embodiment of this disclosure, includes storing a data object in a repository, indexing said data object in the repository by using a first identifying key conforming to a first web services protocol, and indexing said data object in the repository by using a second identifying key conforming to a second web services protocol.

According to another exemplary embodiment, a method for supporting multiple versions of a web services standard includes storing a data object in a repository, storing a first unique identifying key along with said data object in the repository, said first unique identifying key being selected or assigned in accordance with a first web services standard, and storing a second unique identifying key along with said data object in the repository, said second unique identifying key being selected or assigned in accordance with a second web services standard.

An apparatus for supporting multiple versions of a web services protocol, according to an exemplary embodiment of this disclosure, includes a repository for storing one or more data objects, first indexing means for indexing a data object in the repository by using a first identifying key conforming to a first web services protocol, and second indexing means for indexing said data object in the repository by using a second identifying key conforming to a second web services protocol.

An apparatus for supporting multiple versions of a web services standard, according to an exemplary embodiment, includes a data object-storage unit for storing a data object, a first-key-storing unit for storing a first unique identifying key along with said data object, said first unique identifying key being selected or assigned in accordance with a first web services standard, and a second-key-storing unit for storing a second unique identifying key along with said data object, said second unique identifying key being selected or assigned in accordance with a second web services standard.

According to another exemplary embodiment, an apparatus for supporting multiple versions of a web services standard, includes a repository for storing a data object, and two or more identifier keys conforming to respective versions of the web services standard for indexing the data object in the repository.

The methods and apparatuses of this disclosure may be embodied in one or more computer programs stored on a computer readable medium or program storage device and/or transmitted via a computer network or other transmission medium in one or more segments or packets.

BRIEF DESCRIPTION OF THE DRAWINGS

The features of the present application can be more readily understood from the following detailed description with reference to the accompanying drawings wherein.

DETAILED DESCRIPTION

The present disclosure provides tools (in the form of methodologies, apparatuses, and systems) for supporting multiple versions of a web services protocol. Web services share objects of information with one another by referencing unique identifier keys. According to embodiments of the present disclosure, a server for web services which is capable of handling unique identifier keys of more than one web services protocol can be used.

For example, according to one exemplary embodiment, a server for web services can be adapted to be capable of handling unique identifiers for UDDI Version 2 and UDDI Version 3. As described above, discovery and integration of web services may be aided by the use of a UDDI repository. UDDI repositories may contain one or more data objects. For example, a UDDI repository may contain one data object for each web service listed in the UDDI repository. Data objects within UDDI repositories may be called upon by referencing unique identifier keys. These unique identifier keys may also be used by the UDDI repository to allow for the discovery and integration of web services.

Repositories (for example UDDI repositories), according to exemplary embodiments of the present disclosure, may be able to support multiple versions of a web services protocol or standard. The multiple versions of a web services protocol or standard may be, for example, multiple incremental versions of UDDI standards, for example UDDI Version 1, UDDI Version 2, etc. However, embodiments of the present disclosure are not limited to repositories that support multiple versions of UDDI standards. The multiple versions of a web services protocol or standard may refer to a set of standards or protocols that are not UDDI standards and/or not incremental improvements of one another.

The following exemplary embodiments are set forth to aid in an understanding of the subject matter of this disclosure, but are not intended, and should not be construed, to limit in any way the claims which follow thereafter. Therefore, while specific terminology is employed for the sake of clarity in describing some exemplary embodiments, the present disclosure is not intended to be limited to the specific terminology so selected, and it is to be understood that each specific element includes all technical equivalents which operate in a similar manner.

Figure 1:
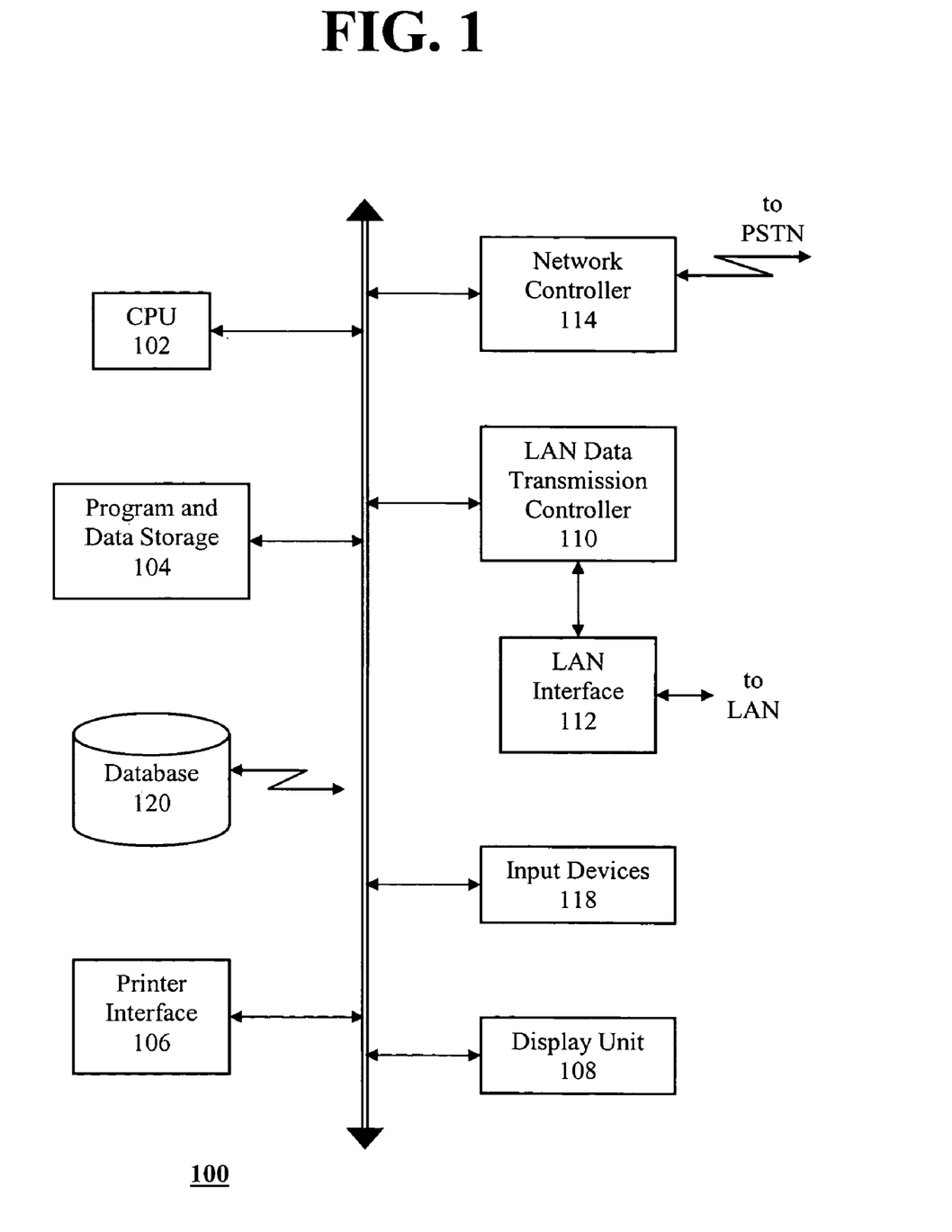
FIG. 1 shows an example of a computer system capable of implementing the methods and apparatuses of this disclosure.

FIG. 1 shows an example of a computer system 100 which may implement the methods and apparatuses of the present disclosure. The apparatus and method of the present disclosure may be implemented in the form of a software application running on a computer system, for example, a mainframe, personal computer (PC), handheld computer, server, etc. The software application may be stored on computer readable media or program storage device locally accessible by the computer system, for example, floppy disk, optical disc, hard disk, etc., or may be remote from the computer system and accessible via a hard wired or wireless connection to a computer network (for example, a local area network, the Internet, etc.) or another transmission medium.

The computer system 100 can include a central processing unit (CPU) 102, program and data storage devices 104, a printer interface 106, a display unit 108, a (LAN) local area network data transmission controller 110, a LAN interface 112, a network controller 114, an internal bus 116, and one or more input devices 118 (for example, a keyboard, mouse etc.). As shown, the system 100 can be connected to a database 120, via a link 122.

Figure 2:
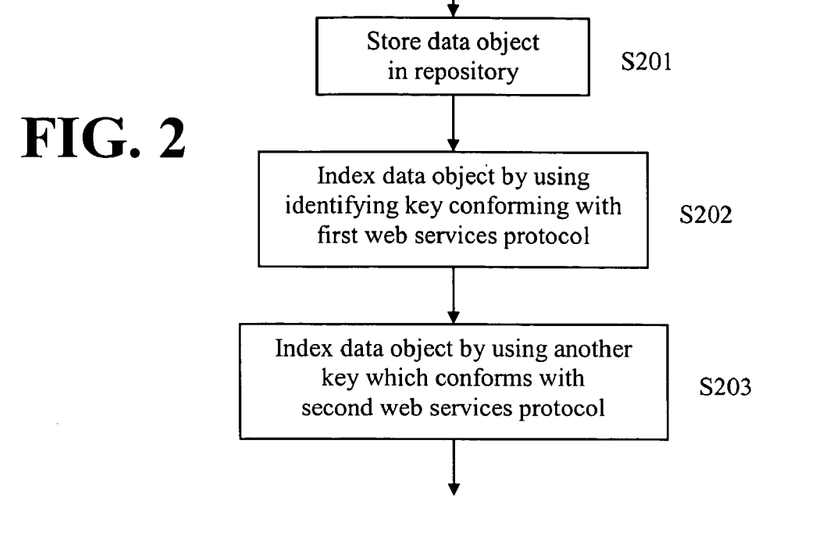
FIG. 2 shows a flow chart corresponding to a method for supporting multiple versions of a web services protocol, according to an exemplary embodiment of this disclosure.

A method for supporting multiple versions of a web services protocol, according to an embodiment of this disclosure, will be explained with reference to FIG. 2. A data object is stored in a repository (step S201). The data object in the repository is indexed by using a first identifying key conforming to a first web services protocol (step S202), and is also indexed by using a second identifying key conforming to a second web services protocol (step S203).

Figure 3:
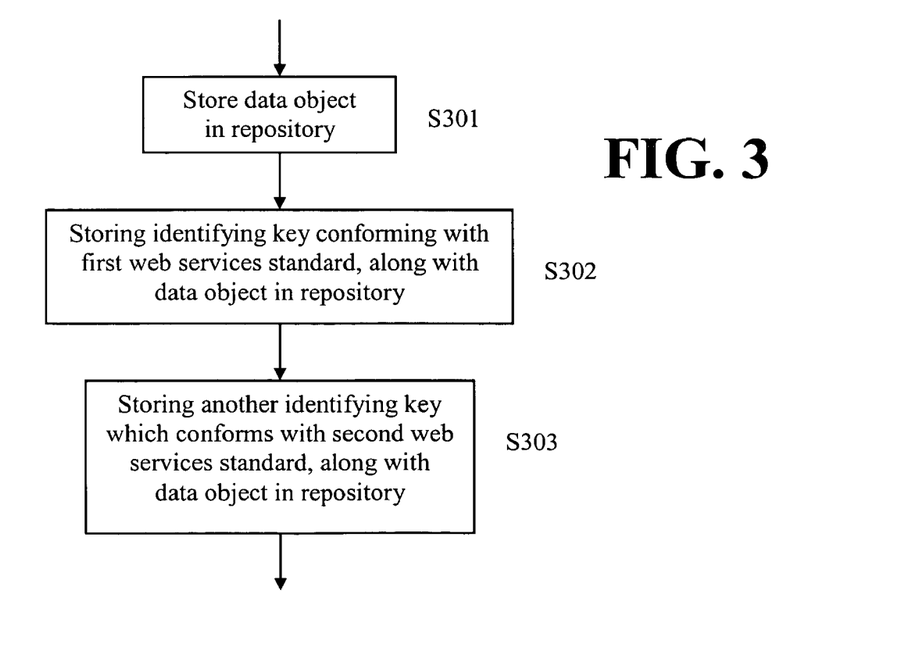
FIG. 3 shows a flow chart corresponding to a method for supporting multiple versions of a web services standard, according to another exemplary embodiment.

A method for supporting multiple versions of a web services standard according to another embodiment is illustrated in FIG. 3. A data object is stored in a repository (step S301). A first unique identifying key is stored along with said data object in the repository (step S302). The first unique identifying key is selected or assigned in accordance with a first web services standard. A second unique identifying key is stored along with said data object in the repository, said second unique identifying key being selected or assigned in accordance with a second web services standard (step S303).

Figure 4:
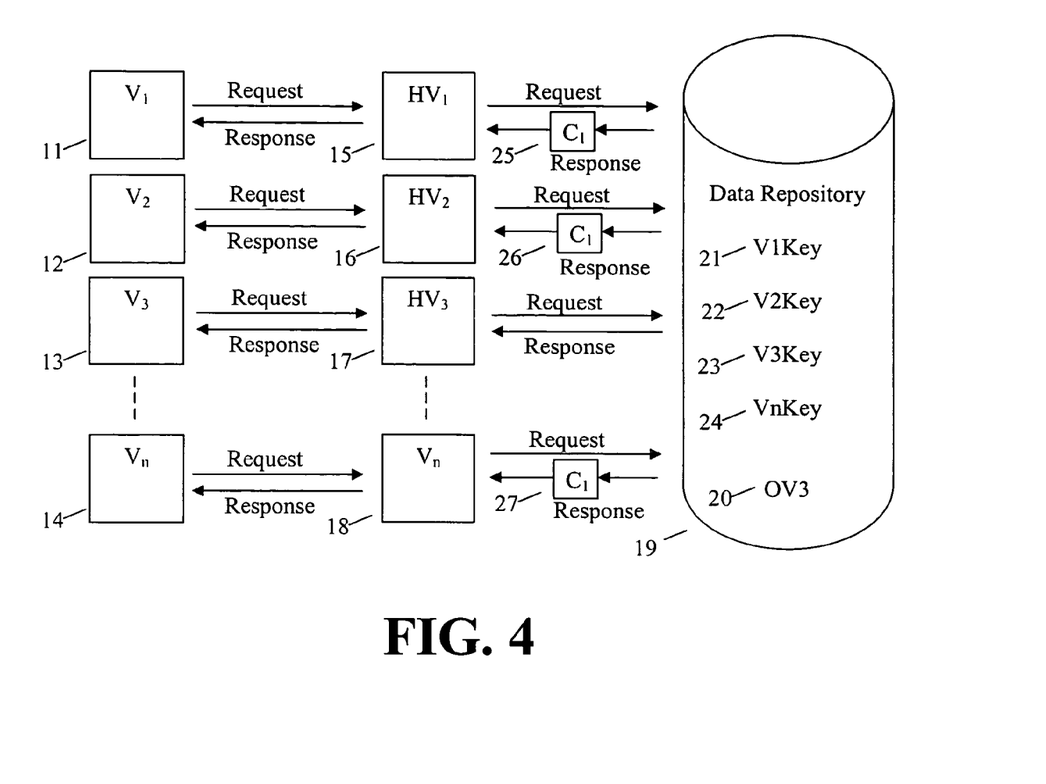
FIG. 4 shows a schematic diagram corresponding to an apparatus for supporting multiple versions of a web services standard, according to an exemplary embodiment.

FIG. 4 illustrates a schematic of a data repository according to an exemplary embodiment. A data repository 19 is used as an example of a server that utilizes UDDI protocols, however, any server running any web service can be equally capable of utilizing the present disclosure. The apparatus of this embodiment can handle unique identifier keys of more than one UDDI version. Therefore a client software system can access the data repository regardless of the UDDI version in use by the client. FIG. 4 shows four such clients each using a different UDDI version. The four clients are 11, 12, 13, 14, and they are using UDDI versions $V_1$, $V_2$, $V_3$ and a future version of UDDI (labeled $V_n$), respectively. The present disclosure can support any number of future UDDI versions.

Each client ($V_1$ 11, $V_2$ 12, $V_3$ 13 and $V_n$ 14) may issue a request for information directed to the data repository 19 in the UDDI version supported by that client (11-14) sending the request. According to embodiments of the present disclosure, each request may be sent to a request handler 15-18. Multiple request handlers 15-18 may be used, preferably, one request handler 15-18 for each UDDI version supported by the data repository 19. According to the exemplary embodiment shown in FIG. 4, four request handlers 15-18 can be used to support UDDI versions 1, 2, 3 and n, wherein a request handler 15 handles requests from clients 11 that utilize UDDI version 1, a request handler 16 handles requests from clients 12 that utilize UDDI version 2, a request handler 17 handles requests from clients 13 that utilize UDDI version 3 and a request handler 18 handles requests from clients 14 that utilize UDDI version n.

All of the requests to the UDDI server can be received on a single channel, and distributed to the appropriate handler for the version of the request. This is possible because each version of UDDI uses a different XML namespace. It is easy to identify the namespace on the incoming request and dispatch it to the handler appropriate to that version. This allows the UDDI server to offer a single channel to requesters, while still handling multiple versions of requests.

Objects of information 20 can be stored in the data repository 19. Objects are generally written according to the current UDDI version (in the example of FIG. 4, it is UDDI Version 3). Objects 20 can be associated with a unique identifier key for the version of UDDI for which the object 20 has been written in, here a UDDI Version 3 key 23. The objects 20 may also be associated with a unique identifier key for other supported UDDI version. Here, the object 20 is also associated with a unique identifier key for UDDI Version 1 21, Version 2 22 and Version n 24.

The associated identifier keys for other supported UDDI versions may be generated based on the unique identifier key for the version of the UDDI standard to which the object 20 has been written to conform. An example of a method for generating other identifier keys according to an embodiment of the present disclosure is described below in connection with FIG. 7.

Each request handler 15-18 is capable of accepting a received request and passing on the requests to the data repository 19 in accordance with its respective UDDI version.

The data repository 19 can process requests in any supported UDDI version by cross-referencing the unique identifier keys of the requests with the associated unique identifier keys 21-24 for the objects 20 stored in the data repository.

To enhance the speed at which supported UDDI versions may be cross-referenced, the object 20 may be indexed for each supported UDDI standard version key 21-24.

The data repository may generate a response for each respective request received. The responses may contain a response object and/or a response unique identifier key. The responses may conform to the current UDDI version that the object 20 have been written in, here Version 3. While responses to Version 3 requests may be sent directly to the Version 3 request handler 17, responses to other requests can be sent to converters 25-27 which convert the responses into the UDDI version corresponding to the UDDI version to which the request conforms.

Some responses to requests by Version 3 clients 13 may still be manipulated after being generated by the data repository 19. For example, a response may be generated by the data repository 19, and while conforming to UDDI Version 3, all of the various keys 21-24 may be associated with that response. Where this is the case, the excess keys 21, 22, 24 are removed prior to the response reaching the version 3 request handler 17.

More generally, where the version of the object 20 is a version other than Version 3, converters 25-27 may be provided for versions other than the native version of the object 20. Where no converter is required, excess keys 21-24 may be removed. For example, when future versions of the UDDI standard are released, the object 20 may conform to the new version and additional converters can be provided for responses sent to the Version 3 client 13.

The converters 25-27 may convert the response objects and/or response unique identifier keys for each of the responses into the UDDI version that corresponds to the respective requests. For example, a request conforming to UDDI Version 1 can be received by the data repository 19. The data repository 19 may then cross check the request against the Version 1 key 21 and issue a response conforming to UDDI Version 3. This response may then be sent through a Version 1 converter 25 where any response objects and/or response unique identifier keys within the response are converted to UDDI version 1.

Responses that have been converted and responses that do not require conversion can be sent to the respective request handlers 15-18 that sent the requests. From there, the responses can be sent to the client 11-14 that issued the corresponding request thereby completing an interaction between client 11-14 and data repository 19.

When the object 20 is stored in the data repository 19, that object may conform to the current UDDI version (that is Version 3 in FIG. 4). This version may be the native UDDI version of the object 20. An object 20 written to conform to a particular UDDI version typically has a key conforming to that version. However, such an object 20 likely not have keys conforming to other (for example, prior) UDDI versions.

Figure 5:
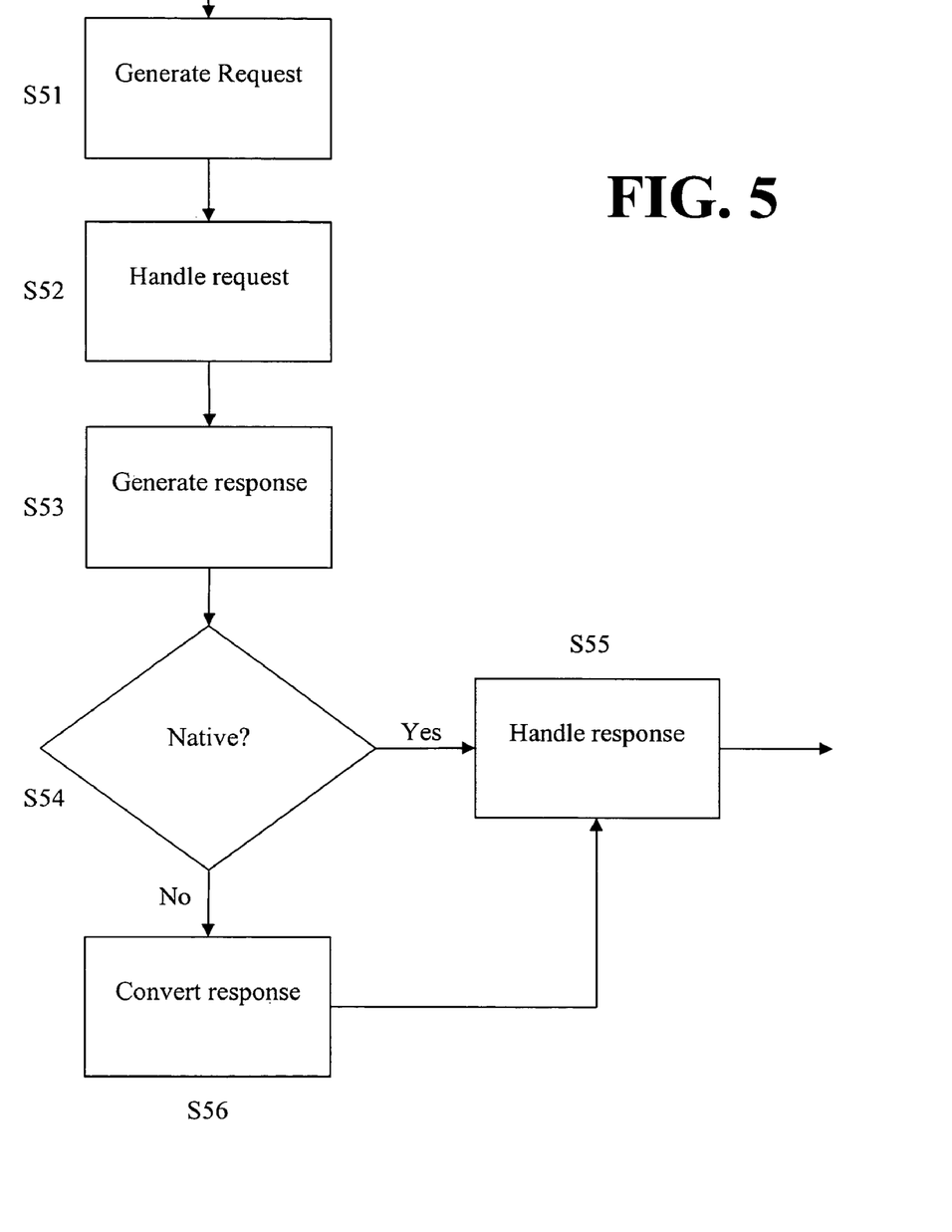
FIG. 5 is a flow chart corresponding to a method for handling a UDDI request, according to an exemplary embodiment.

A method for handling a UDDI request, according to an exemplary embodiment (FIG. 5), is discussed below. A client may generate a request (Step S51). For example, this request may be to identify a particular web service corresponding to an object stored in a UDDI repository. The request may conform to a particular version of the UDDI standards. The request may be handled by a request handler (Step S52) that is set up to handle requests conforming to the particular version of the UDDI standards. Handling of the request may include passing the request to the UDDI repository. The UDDI repository may generate a response based on the request (Step S53). For example, the response may include information pertaining to the particular web service. If the version of the UDDI standards to which the response conforms (that is, the native version) is the same version as the particular version of the UDDI standards to which the request conforms (Step S54, Yes), then the response may be handled by the request handler (Step S55). If the native version is not the same as the particular version of the UDDI standards to which the request conforms (Step S54, No), then the response may be converted by a converter (Step S56) and the response is handled by the request handler (Step S55). Handling of the response may include passing the response back to the client that sent the request.

Figure 6:
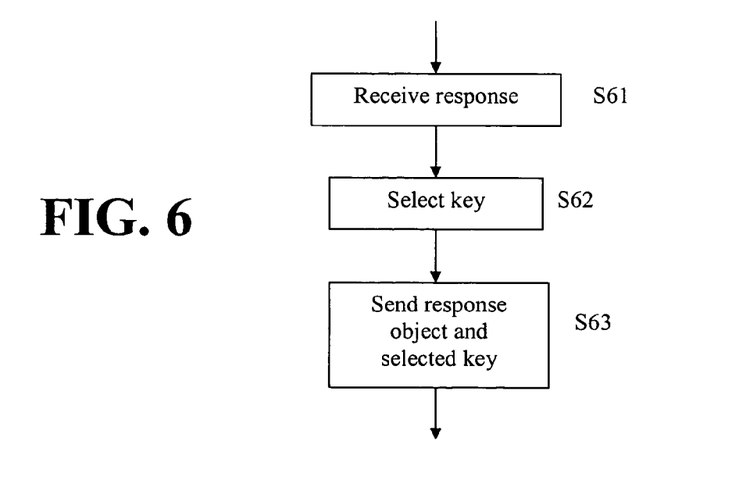
FIG. 6 is a flow chart illustrating response conversion according to an exemplary embodiment.

Response conversion, according to an exemplary embodiment (FIG. 6), is discussed below. A response may be received by a converter (Step S61). This response may contain a response object and one or more keys. Each key may conform to a different supported version of UDDI standards. The converter may then select the key that conforms to a desired version of the UDDI standard (Step S62). The desired version of the UDDI standard may be the version that the converter is designed to convert to and this may be the version to which a request for which the response was generated conforms. The response object and the selected key may then be sent to the client that sent the request (Step S63).

Additional techniques for response conversion are discussed in commonly owned U.S. Provisional Application No. 60/573,542, filed May 21, 2004 and entitled "SIMULTANEOUS SUPPORT OF MULTIPLE UDDI VERSIONS", the entire contents of which are incorporated herein by reference.

Figure 7:
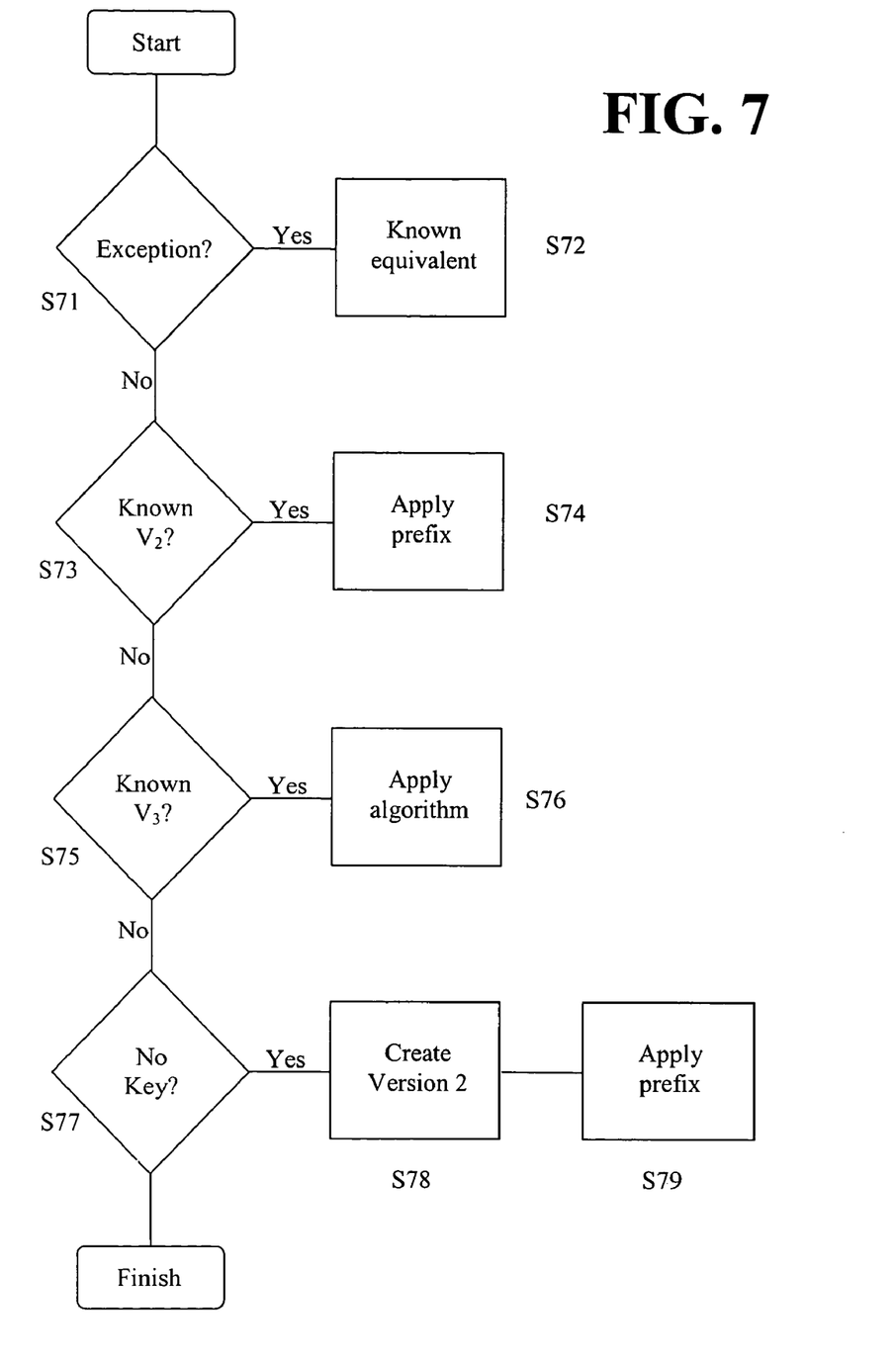
FIG. 7 shows a flow chart corresponding to a method for generating keys conforming to UDDI versions other than the native UDDI version, according to an exemplary embodiment.

FIG. 7 shows how keys conforming to other UDDI versions can be generated. FIG. 7 relates to keys conforming to UDDI Version 2 and UDDI Version 3. However, these UDDI versions have been picked as an example, and the following method can apply to any number of UDDI versions. Some keys conforming to one UDDI standard already have a key conforming to another UDDI standard, for example both Version 2 and Version 3 keys can be pre-assigned. Such cases are exceptions to the general case where only one key has been assigned. Therefore in creating additional keys, whether such an exception applies is considered (Step S71). If such an exception applies (Step S71, Yes), the known equivalent key is used as the other key (Step S72). For example, if the native key is a Version 3 key and a known equivalent Version 2 key has been pre-assigned, then the known equivalent Version 2 key is used as the Version 2 key.

If there is no such exception and no equivalent keys are known (Step S71, No), it may be determined whether the native key is a Version 2 key (Step S73). If the native key is a Version 2 key (Step S73, Yes), then a Version 3 key can be generated by applying a prefix to the Version 2 key (Step S74). For example, if the Version 2 key is 5a389ad2-22dd-11d1-aa77-002035b29092, a prefix such as uddi:acme.com: may be added, so that the Version 3 key can be uddi:acme.com:5a389ad2-22dd-11d1-aa77-002035b29092.

If the native key is not a Version 2 key (Step S73, No), then it is determined whether the native key is a Version 3 key (Step S75). If the native key is a Version 3 key (Step S75, Yes), then a Version 2 key can be generated by applying a conversion algorithm to the Version 3 key (Step S76). For example, the algorithm defined in the UDDI V3 standard may be used. This algorithm involves creating an MD5 digest of the V3 key, then modifying it slightly to conform to the format of UUID (the UDDI Version 2 unique identifier key). This method being fully described within the UDDI Version 3 standard is incorporated herein by reference.

If the native key is not a Version 3 key (Step S75, No), then it is determined whether there are no keys known (Step S77). According to this example. (FIG. 7), only Version 2 and Version 3 keys are possibilities. Therefore, if the native key is not Version 2 (Step 73, No) and the native key is not Version 3 (Step 75, No) then there is no key (Step S77, Yes). In this event, first a Version 2 key is created to conform to the UUID format as described in the UDDI Version 2 standard (Step S78). Then a Version 3 key is created by applying the prefix to the Version 2 key (Step S79), as done in Step S74.

The specific embodiments described herein are illustrative, and many additional modifications and variations can be introduced on these embodiments without departing from the spirit of the disclosure or from the scope of the appended claims. For example, elements (such as steps) and/or features of different illustrative embodiments may be combined with each other and/or substituted for each other within the scope of this disclosure and appended claims.

Additional variations may be apparent to one of ordinary skill in the art from reading U.S. provisional application Ser. No. 60/573,597, filed May 21, 2004, the entire contents of which are incorporated herein by reference.

What is claimed is:

1. A method for supporting multiple versions of a web services protocol, comprising:
   storing a data object in a repository;
   indexing said data object in the repository by using a first identifying key conforming to a first version of a web services protocol;
   indexing said data object in the repository by using a second identifying key conforming to a second version of a web services protocol;
   receiving a request for information associated with the data object, the request conforming to a particular version of a web services protocol;
   generating with the repository, based on the request, a response that includes:
      at least one of the first identifying key and the second identifying key; and
      the data object;
   after generating the response, converting the at least one of the first identifying key and the second identifying key to the particular version of the web services protocol to which the request conforms; and
   after generating the response, converting the data object to the particular version of the webs services protocol to which the request conforms.

2. The method of claim 1, further comprising storing the first and second identifier keys in the repository.

3. The method of claim 1, wherein the data object is stored in the repository in accordance with a native version standard corresponding to one of the first web services protocol and the second web services protocol.

4. The method of claim 3, further comprising:
   receiving a request conforming to one of the first web services protocol and the second web services protocol;
   generating a response conforming to the native version standard based on the received request;
   determining if the one of the first web services protocol and the second web services protocol to which the request conforms is the native version standard; and
   converting the response to conform to the one of the first web services protocol and the second web services protocol to which the request conforms, if the one of the first web services protocol and the second web services protocol to which the request conforms is not the native version standard.

5. A computer system comprising:
a processor; and
a program storage device readable by the computer system, tangibly embodying a program of instructions executable by the processor to perform the method claimed in claim 1.

6. A program storage device readable by a machine, tangibly embodying a program of instructions executable by the machine to perform the method claimed in claim 1.

7. A method for supporting multiple versions of a web services standard, comprising:
storing a data object in a repository;
storing a first unique identifying key along with said data object in the repository, said first unique identifying key being selected or assigned in accordance with a first version of a web services standard;
storing a second unique identifying key along with said data object in the repository, said second unique identifying key being selected or assigned in accordance with a second version of a web services standard;
receiving a request for information associated with the data object, the request conforming to a particular version of a web services standard;
generating with the repository, based on the request, a response that includes:
at least one of the first identifying key and the second identifying key; and
the data object;
after generating the response, converting the at least one of the first identifying key and the second identifying key to the particular version of the web services standard to which the request conforms; and
after generating the response, converting the data object to the particular version of the webs services protocol to which the request conforms.

8. The method of claim 7, further comprising storing one or more additional unique identifying keys, said additional unique identifying keys being selected or assigned in accordance with additional web services standards.

9. The method of claim 7, wherein said second unique identifying key comprises a prefix.

10. The method of claim 7, wherein said data object is stored in accordance with said first web services standard.

11. The method of claim 10, wherein said first web services standard is a most recent UDDI version.

12. The method of claim 7, wherein said data object comprises content associated with one or more of said first unique identifying key and said second unique identifying key.

13. The method of claim 8, wherein said data object comprises content associated with one or more of said first unique identifying key, said second unique identifying key, and said additional unique identifying keys.

14. The method of claim 7, further comprising:
receiving a request in accordance with a UDDI standard; and
generating a response conforming to said UDDI standard.

15. The method of claim 14, wherein said UDDI standard is one of said first web services standard and said second web services standard.

16. The method of claim 14, wherein said UDDI standard is one of said first UDDI standard, said second UDDI standard and said additional UDDI standards.

17. A computer system comprising:
a processor; and
a program storage device readable by the computer system, tangibly embodying a program of instructions executable by the processor to perform the method claimed in claim 7.

18. A program storage device readable by a machine, tangibly embodying a program of instructions executable by the machine to perform the method claimed in claim 7.

19. An apparatus for supporting multiple versions of a web services protocol, comprising:
a repository for storing one or more data objects;
first indexing means for indexing a data object in the repository by using a first identifying key conforming to a first version of a web services protocol;
second indexing means for indexing said data object in the repository by using a second identifying key conforming to a second version of a web services protocol;
receiving means for receiving a request for information associated with the data object, the request conforming to a particular version of a web services protocol;
generating means for generating, based on the request, a response that includes:
at least one of the first identifying key and the second identifying key; and
the data object;
converting means for, after generating the response, converting the at least one of the first identifying key and the second identifying key to the particular version of the web services protocol to which the request conforms; and
the converting means for, after generating the response, converting the data object to the particular version of the webs services protocol to which the request conforms.

20. An apparatus for supporting multiple versions of a web services standard, comprising:
a data object-storage unit for storing a data object;
a first-key-storing unit for storing a first unique identifying key along with said data object, said first unique identifying key being selected or assigned in accordance with a first version of a web services standard;
a second-key-storing unit for storing a second unique identifying key along with said data object, said second unique identifying key being selected or assigned in accordance with a second version of a web services standard;
a receiving unit for receiving a request for information associated with the data object, the request conforming to a particular version of a web services protocol;
a generating unit for generating with the repository, based on the request, a response that includes:
at least one of the first identifying key and the second identifying key; and
the data object;
a converting unit for, after generating the response, converting the at least one of the first identifying key and the second identifying key to the particular version of the web services standard to which the request conforms; and
the converting unit for, after generating the response, converting the data object to the particular version of the webs services protocol to which the request conforms.

21. The apparatus of claim 20, further comprising one or more additional-key-storing units for storing one or more additional unique identifying keys, said additional unique identifying keys being selected or assigned in accordance with additional web services
standards.

22. The apparatus of claim 20, wherein said second unique identifying key comprises a prefix.

23. The apparatus of claim 20, wherein said data object is stored in accordance with said first web services standard.

24. The apparatus of claim 23, wherein said first UDDI standard is a most recent UDDI version.

25. The apparatus of claim 20, wherein said data object comprises content associated with one or more of said first unique identifying key and said second unique identifying key.

26. The apparatus of claim 21, wherein said data object comprises content associated with one or more of said first unique identifying key, said second unique identifying key, and said additional unique identifying keys.

27. The apparatus of claim 20, wherein said data object-storing unit comprises a database and said database is capable of receiving a request in accordance with a UDDI standard and generating a response in said UDDI standard.

28. The apparatus of claim 27, wherein said UDDI standard is one of said first web services standard and said second web services standard.

29. The apparatus of claim 21, wherein said data object-storing unit comprises a database and said database is capable of receiving a request in accordance with a UDDI standard and generating a response in said UDDI standard, and wherein said UDDI standard is one of said first web services standard, said second web services standard and said additional web services standard.

30. An apparatus for supporting multiple versions of a web services standard, comprising:
    a repository for storing a data object;
    two or more identifier keys conforming to respective versions of the web services standard for indexing the data object in the repository;
    and wherein the repository is further configured to:
        receiving a request for information associated with the data object, the request conforming to a particular version of a web services protocol;
        generating with the repository, based on the request, a response that includes:
            at least one of the first identifying key and the second identifying key; and
            the data object;
        after generating the response, converting the at least one of the first identifying key and the second identifying key to the particular version of the web services protocol to which the request conforms; and
        after generating the response, converting the data object to the particular version of the webs services protocol to which the request conforms.

31. The apparatus of claim 30, wherein the two or more identifier keys includes a first identifier key corresponding to a first version of the web services standard and a second identifier key corresponding to a second version of the web services standard.

32. The apparatus of claim 30, wherein the two or more identifier keys are stored in the repository.

33. The apparatus of claim 30, wherein the data object conforms to a native version standard corresponding to one of the two or more versions of the web services standard.

34. The apparatus of claim 33, further comprising:
    two or more request handlers for receiving respective requests conforming to the two or more versions of the web services standard and for each request generating a response conforming to the native version standard based on the received request, and for determining if the one of the first web services protocol and the second web services protocol to which the request conforms is the native version standard; and
    one or more converters for converting the response to conform to the one of the two or more versions of the web services standard to which the corresponding request conforms, if the one of the two or more versions of the web services standard to which the corresponding request conforms is not the native version standard, and sending the converted response to the respective two or more request handlers.

* * * * *